(12) United States Patent
Hanamoto et al.

(10) Patent No.: US 10,843,168 B2
(45) Date of Patent: Nov. 24, 2020

(54) ACTIVATED CARBON, AND ADSORPTION FILTER AND WATER PURIFIER BOTH INCLUDING SAME

(71) Applicant: KURARAY CO., LTD., Kurashiki (JP)

(72) Inventors: Tetsuya Hanamoto, Okayama (JP); Mitsunori Hitomi, Okayama (JP); Yoshinari Kobashi, Okayama (JP)

(73) Assignee: KURARAY CO., LTD., Kurashiki (JP)

( * ) Notice: Subject to any disclaimer, the term of this patent is extended or adjusted under 35 U.S.C. 154(b) by 111 days.

(21) Appl. No.: 16/301,666

(22) PCT Filed: Apr. 26, 2017

(86) PCT No.: PCT/JP2017/016530
§ 371 (c)(1),
(2) Date: Nov. 14, 2018

(87) PCT Pub. No.: WO2017/199717
PCT Pub. Date: Nov. 23, 2017

(65) Prior Publication Data
US 2019/0291073 A1 Sep. 26, 2019

(30) Foreign Application Priority Data

May 17, 2016 (JP) .................. 2016-098421

(51) Int. Cl.
*C01B 31/08* (2006.01)
*B01J 20/20* (2006.01)
*C01B 32/30* (2017.01)
*B01J 20/28* (2006.01)
*C02F 1/28* (2006.01)

(52) U.S. Cl.
CPC .............. *B01J 20/20* (2013.01); *B01J 20/28* (2013.01); *B01J 20/2803* (2013.01); *C01B 32/30* (2017.08); *C02F 1/28* (2013.01); *C02F 1/281* (2013.01); *C01P 2006/12* (2013.01); *C01P 2006/14* (2013.01); *C01P 2006/16* (2013.01)

(58) Field of Classification Search
CPC ....................................... C01B 32/30
See application file for complete search history.

(56) References Cited

U.S. PATENT DOCUMENTS 5,990,041 A * 11/1999 Chung .................... D01F 9/12
423/447.6
2017/0209848 A1 7/2017 Takenaka et al.

FOREIGN PATENT DOCUMENTS

| JP | 6-99065 A | 4/1994 |
|---|---|---|
| JP | 11-11921 A | 1/1999 |
| JP | 2003-194992 A | 7/2003 |
| JP | 3528685 B2 | 5/2004 |
| JP | 2010-237216 A | 10/2010 |
| JP | 2013-212458 A | 10/2013 |
| JP | 2013-220413 A | 10/2013 |
| JP | 2015-112518 A | 6/2015 |
| JP | 2016-30697 A | 3/2016 |

OTHER PUBLICATIONS

International Search Report dated Jun. 13, 2017, in PCT/JP2017/016530, filed Apr. 26, 2017.

* cited by examiner

*Primary Examiner* — Stuart L Hendrickson
(74) *Attorney, Agent, or Firm* — Oblon, McClelland, Maier & Neustadt, L.L.P.

(57) ABSTRACT

The present invention relates to an activated carbon for organic compound removal in which the average pore diameter obtained from the following formula by using a BET specific surface area calculated by the nitrogen adsorption method and a pore volume calculated by the HK method is from 1.615 to 1.625 nm: $D=4000 \times V/S$ (wherein, D represents an average pore diameter (nm), V represents a pore volume (mL/g), and S represents a specific surface area ($m^2/g$)).

20 Claims, 4 Drawing Sheets

ACTIVATED CARBON, AND ADSORPTION FILTER AND WATER PURIFIER BOTH INCLUDING SAME

TECHNICAL FIELD

The present invention relates to an activated carbon as well as to an adsorption filter and a water purifier using the same.

BACKGROUND ART

In recent years, safety and hygienic concerns are increasing with regard to water quality of tap water, and removal of harmful substances contained in the tap water, such as free residual chlorine, VOC (volatile organic compounds) such as trihalomethanes, agricultural chemicals, and mold odors, is desired.

In particular, chlorine that is used in tap water or the like for preventing proliferous growth of various kinds of general bacteria is not a nontoxic substance, and there is a fear that, when hair or skin is washed with tap water having a high residual chlorine concentration, the protein of the hair or skin may be denatured and damaged. Also, a slight amount of trihalomethane that is dissolved and present in tap water is suspected to be a carcinogenic substance. In recent years with enhanced concerns for health, there is an increasing importance of a water purifier that can remove trihalomethane and others.

Trihalomethane is a general term for compounds in which three out of four hydrogen atoms in a methane molecule are substituted by halogen, and representative examples thereof include chloroform, dichlorobromomethane, chlorodibromomethane, and bromoform. As an analogous compound, 1,1,1-trichloroethane, which is an organic halogen compound in which three of the hydrogen atoms in ethane are substituted by a chorine atom, is a target substance for removal by a water purifier.

Among these volatile organic compounds, it is already becoming well-known that it is extremely difficult to achieve compatibility particularly between removal of chloroform and removal of 1,1,1-trichloroethane both by adsorption.

Conventionally, use of a water purifier using an activated carbon is known in the art in order to remove these harmful substances.

For example, Patent Literature 1 discloses an activated carbon for a water purifier characterized by being made of an activated carbon in which the specific surface area is set to be 900 to 1100 m$^2$/g; in the measurement of pore distribution by the MP method, the sum pore volume of the pores having a pore diameter of 0.6 nm or less relative to the total pore volume of the pores having a pore diameter of 0 to 2.0 nm is set to be 40 to 45% of the total pore volume; in the measurement of pore distribution by the DH method, the sum pore volume of the pores having a pore diameter of 2.0 nm or less relative to the total pore volume of the pores having a pore diameter of 1 to 100 nm is set to be 20 to 23% of the total pore volume; and the surface oxide amount is set to be 0.05 to 0.14 meq/g.

Also, Patent Literature 2 discloses an activated carbon characterized in that, in the pore diameter distribution represented by the parameter dV/d log R (V: pore volume, R: pore radius), the dV/d log R value is provided with (a) at least one peak value within a range such that the dV/d log R value is 0.03 to 0.2 in a range such that the pore diameter D is 10 Å to 40 Å, and (b) at least one peak value within a range such that the dV/d log R value is 1.0 to 7.0 in a range such that the pore diameter D is 6 Å to 9 Å; small-aperture pores having a pore diameter D of 6 Å to 9 Å are formed on an inner surface of a large number of large-aperture pores having a pore diameter D of 10 Å to 50 Å; and the adsorption volume of trihalomethane at the time of water passing is 118 to 220 ppb·ton.

However, even with the techniques disclosed in the above Patent Literatures 1 and 2, it can be hardly stated that both of chloroform and 1,1,1-trichloroethane are sufficiently removed by adsorption.

Year by year, increased performance of a water purifier is requested, and there is an increasing demand for an adsorption material that can remove volatile organic compounds, particularly an adsorption material that can achieve compatibility between removal of chloroform and removal of 1,1,1-trichloroethane both by adsorption.

CITATION LIST

Patent Literature

Patent Literature 1: Japanese Unexamined Patent Application Publication No. 2013-220413
Patent Literature 2: Japanese Patent No. 3528685

SUMMARY OF INVENTION

In view of the aforementioned problems, an object of the present invention is to provide an activated carbon that satisfies the aforementioned demand as well as an adsorption filter and a water purifier using the same.

As a result of eager studies, the present inventors have found out that the aforementioned problems are solved by an activated carbon having a configuration described below, and have completed the present invention by making further studies based on these findings.

In other words, an activated carbon according to one aspect of the present invention is an activated carbon for organic compound removal in which an average pore diameter obtained from a following formula by using a BET specific surface area calculated by a nitrogen adsorption method and a pore volume calculated by an HK method is from 1.615 to 1.625 nm:

$$D = 4000 \times V/S$$

(wherein, D represents the average pore diameter (nm), V represents the pore volume (mL/g), and S represents the specific surface area (m$^2$/g)).

According to the present invention, there can be provided an activated carbon having a high adsorption performance to volatile organic compounds, particularly an activated carbon extremely excellent in the adsorption performance of chloroform and 1,1,1-trichloroethane.

DESCRIPTION OF EMBODIMENTS

Figure 1:
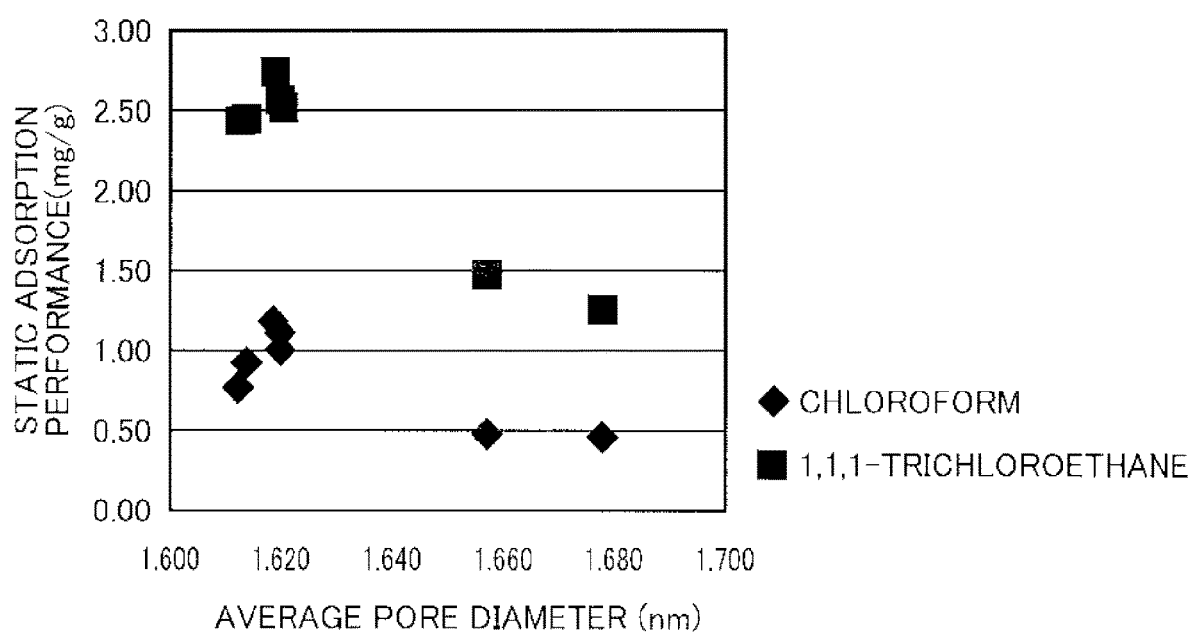
FIG. 1 is a graph showing a relationship between the average pore diameter obtained in the above formula and the performance of static adsorption of volatile organic compounds in water, as measured in the Examples.

Hereafter, embodiments according to the present invention will be specifically described; however, the present invention is not limited to these alone.

An activated carbon according to the present embodiment is characterized in that an average pore diameter obtained from a following formula by using a BET specific surface area calculated by the nitrogen adsorption method and a pore volume calculated by the HK method is from 1.615 to 1.625 nm:

$$D = 4000 \times V/S$$

(wherein, D represents the average pore diameter (nm), V represents the pore volume (mL/g), and S represents the specific surface area ($m^2/g$)).

The activated carbon of the present embodiment is an activated carbon for organic compound removal and is particularly preferably used for removal of volatile organic compounds such as chloroform, 1,1,1-trichloroethane, and trihalomethanes such as dichlorobromomethane, chlorodibromomethane, and bromoform. Further, among these volatile organic compounds, though it has been conventionally assumed to be extremely difficult to achieve compatibility between removal of chloroform and removal of 1,1,1-trichloroethane both by adsorption, the activated carbon of the present embodiment is excellent in the capability of removing these by adsorption.

This seems to be due to the following reason. In a conventional activated carbon, pores suitable for chloroform adsorption are formed first, and thereafter those pores are turned into pores suitable for 1,1,1-trichloroethane. In contrast, in the activated carbon of the present embodiment, pores suitable for 1,1,1-trichloroethane adsorption are formed while maintaining the pores suitable for chloroform adsorption.

Further, the average pore diameter obtained in the above formula is preferably from 1.616 to 1.623 nm, more preferably from 1.618 to 1.621 nm.

In the activated carbon of the present embodiment, the adsorption removal capability on the desired volatile organic compounds decreases when the average pore diameter is less than 1.615 nm or exceeds 1.625 nm.

The activated carbon of the present embodiment is not particularly limited regarding other configurations as long as the range of the average pore diameter obtained by the above formula is satisfied, so that, for example, two or more different kinds of activated carbon may be contained.

Also, in the activated carbon of the present embodiment, the HK ET specific surface area calculated by the nitrogen adsorption method is preferably about 1000 to 1350 $m^2/g$, more preferably about 1050 to 1300 $m^2/g$, and still more preferably about 1100 to 1250 $m^2/g$. When the specific surface area is too large, the volatile organic compounds are hardly adsorbed. When the specific surface area is too small, there is a fear that the performance of removing volatile organic compounds and others may be degraded.

The shape of the activated carbon of the present embodiment may be any shape such as a particle shape or a fiber shape (thread shape, woven cloth (cloth) shape, felt shape) and can be suitably selected in accordance with the purpose of use; however, the particle shape providing a high adsorption performance per volume is preferable. When an activated carbon having a particle shape is used for a water purifier, it is possible to use, for example, a powdery activated carbon in which the 10% particle diameter (D10) in the cumulative particle size distribution at volume standard is about 15 to 35 μm, and the 50% particle diameter (D50) in the cumulative particle size distribution at volume standard is about 30 to 150 μm. When the shape is within such a range, the activated carbon seems to be excellent in moldability and in strength at the time of forming a molded body in addition to the aforementioned removal performance by adsorption.

In the present embodiment, the numerical values of the above D10, D50, and D90 are values as measured by the laser diffraction/scattering method, and the measurement may be carried out, for example, with a wet particle size distribution measuring instrument (MICROTRAC MT3300EX II) manufactured by Nikkiso Co., Ltd. or the like.

The activated carbon of the present embodiment can also be obtained by carbonizing and/or activating a carbonaceous material (for example, coconut shell or phenolic resin). If carbonization is necessary, the carbonization may be typically carried out, for example, at a temperature of about 400° C. to 800° C., preferably about 500° C. to 800° C., and more preferably about 550° C. to 750° C., in the absence of oxygen or air. The activation may be carried out either by the gas activation method or the chemical activation method. When the activated carbon is to be used for purification of water, the gas activation method is preferable because of leaving a less amount of residual impurities. In the activated carbon of the present invention, pores must be formed while enhancing the crystallinity in order to form specific sharp pores. When the activation temperature is too high, the crystallinity is enhanced too much, so that sharp pores are hardly formed, or it may be difficult to form sharp pores because the pores rapidly react with an activation gas. On the other hand, when the activation temperature is too low, the crystallinity is low, so that the reactivity with the activation gas is enhanced, making it difficult to form sharp pores. Accordingly, it seems that the activated carbon can be formed to have pores capable of adsorbing a substance having a comparatively larger molecule size such as 1,1,1-trichloroethane while having pores suitable for chloroform adsorption by activating with an activation gas at an activation temperature of about 850° C. to 950° C. in several hours until a particular specific surface area (800 to 1000 $m^2/g$) or a particular pore volume (benzene adsorption amount: 23 to 28% by mass) is attained, and thereafter allowing to react with the activation gas at 850° C. to 1000° C. rapidly in a short period of time (for example, 5 minutes to 30 minutes).

The carbonaceous material is not particularly limited. Examples of the carbonaceous material include plant-series carbonaceous materials (for example, materials derived from plants, such as a wood, a sawdust, a charcoal, a fruit shell such as a coconut shell or a walnut shell, a fruit seed, a by-product of pulp production, a lignin, and blackstrap molasses), mineral-series carbonaceous materials (for example, materials derived from minerals, such as peat, lignite, brown coal, bituminous coal, anthracite coal, coke, coal tar, coal tar pitch, petroleum distillation residue, and petroleum pitch), synthetic-resin-series carbonaceous materials (for example, materials derived from synthetic resins, such as a phenolic resin, polyvinylidene chloride, and an acrylic resin), and natural-fiber-series carbonaceous materials (for example, materials derived from natural fibers, such as a natural fiber (e.g., a cellulose) and a regenerated fiber (e.g., a rayon)). These carbonaceous materials may be used either alone or in combination of two or more kinds. Among these carbonaceous materials, an activated carbon obtained by using a coconut shell as a raw material is preferred in view of the fact that such a material easily forms developed micropores that are involved in the performance of adsorbing volatile organic compounds defined in JIS S3201(2010).

After activation, the activated carbon is washed for removing ash components or chemical agents when a plant-series carbonaceous material such as a coconut shell or a mineral-series carbonaceous material containing impurities such as an alkaline metal, alkaline earth metal, or transition metal is used. For the washing, a mineral acid or water is used. The mineral acid is preferably hydrochloric acid, which has a high washing efficiency.

When the adsorption volume of the activated carbon is excessively small, it cannot be stated that the activated carbon possesses sufficient adsorption capability. When the adsorption volume is excessively large, the activated carbon is in an excessively activated state and has an increased pore diameter, so that the power of adsorbing and retaining harmful substances tends to decrease. Therefore, the adsorption volume of the activated carbon of the present embodiment, though depending on the purpose of use, is preferably set so that the benzene adsorption amount (saturated adsorption amount when aeration is made at a concentration of $1/10$ of the saturated benzene concentration at 20° C.) will be about 28% to 33% by mass. The activated carbon of the present embodiment can be used for various purposes of use by adjusting this benzene adsorption amount of the activated carbon in accordance with the purpose of use.

The adsorption filter of the present embodiment contains the activated carbon described above and a polymer binder.

When the polymer binder has a fiber shape, the polymer binder is not particularly limited as long as the binder can be fibrillated to entangle and shape a fibrous activated carbon and a granular activated carbon, so that a wide variety of binders including synthetic binders and natural binders can be used. Examples of such binders include acrylic fibers, polyethylene fibers, polypropylene fibers, polyacrylonitrile fibers, cellulose fibers, nylon fibers, aramid fibers, and pulp. The fiber length of the fibrous binder is preferably 4 mm or less.

Two or more kinds of these fibrous binders may be used in combination. As a particularly preferable embodiment, a polyacrylonitrile fiber or pulp can be used as the binder. This enhances the molded body density and the molded body strength to a further extent and can suppress decrease in the performance.

Also, the polymer binder having a powdery shape is not particularly limited as long as the polymer binder can shape a granular activated carbon, and examples thereof include a polyethylene powder, a polypropylene powder, and an ethylene-acrylic acid copolymer resin powder.

Two or more kinds of these powdery binders may be used in combination. As a particularly preferable embodiment, a polyethylene powder can be used as the binder. This seems to enhance the molded body density and the molded body strength to a further extent and can suppress decrease in the performance.

In the present embodiment, the water-passing property of the fibrous polymer binder is about 10 to 150 mL in terms of a CSF value. In the present embodiment, the CSF value is a value obtained by measurement in accordance with JIS P8121 "Pulps-Determination of Drainability" Canadian Standard Freeness method. Also, the CSF value can be adjusted, for example, by fibrillating the binder.

When the CSF value of the fibrous polymer binder is less than 10 mL, the water-passing property is not obtained, raising a fear that the strength of the molded body may decrease, and also the pressure loss may increase. On the other hand, when the CSF value exceeds 150 mL, the powdery activated carbon cannot be sufficiently sustained, raising a possibility that the strength of the molded body may decrease, and also the filter may be poor in the adsorption performance.

Also, the adsorption filter of the embodiment may contain functional components other than these as long as the effects of the present invention are not inhibited. For example, a zeolite-based powder (lead adsorption material), an ion-exchange resin, or a chelate resin capable of removing soluble lead by adsorption, various kinds of adsorption materials containing a silver ion and/or a silver compound for imparting antimicrobial property, and the like can be added in arbitrary amounts; however, these are blended typically at 0.1 to 30 parts by mass.

The mixing ratio of each component in the adsorption filter using the fibrous polymer binder of the present embodiment is set to be such that the polymer binder is contained at about 4 to 10 parts by mass relative to 100 parts by mass of the mixture of the activated carbon and the functional components in view of the effect of adsorbing the volatile organic compounds, the moldability, and the like. When the amount of the polymer binder is less than 4 parts by mass, a sufficient strength may not be obtained, raising a fear that the molded body cannot be formed. Also, when the amount of the polymer binder exceeds 10 parts by mass, there is a fear that the adsorption performance may be degraded. More preferably, the polymer binder is blended at 4.5 to 6 parts by mass relative to 100 parts by mass of the mixture of the activated carbon and the functional components.

Production of an adsorption filter using the fibrous polymer binder of the present embodiment is carried out by an arbitrary method, so that the production method is not particularly limited. In view of efficient production, the slurry suction method is preferable. More specifically, a cylindrical adsorption filter (molded body) can be fabricated, for example, by preparing a forming mold having a doubled tube shape in which numerous small holes for suction are provided, and sucking a slurry from a central part, as disclosed in Japanese Unexamined Patent Publication No. H10-5580.

Also, in the present embodiment, the powdery polymer binder typically has a melt mass flow rate (MFR g/10 min) of 30 or less, preferably 20 or less, more preferably 10 or less, and still more preferably 2 or less. The melt mass flow rate is defined in JIS K 7210-1999. When the melt mass flow rate exceeds 30, the surface of the activated carbon is covered, raising a fear that the adsorption performance may be degraded.

Also, the adsorption filter using the powdery polymer binder of the present embodiment may contain functional components other than this powdery binder as long as the effects of the present invention are not inhibited. For example, a zeolite-based powder (lead adsorption material), an ion-exchange resin, or a chelate resin capable of removing soluble lead by adsorption, various kinds of adsorption materials containing a silver ion and/or a silver compound for imparting antimicrobial property, and the like can be added in arbitrary amounts; however, these are blended typically at 0.1 to 30 parts by mass.

The mixing ratio of each component in the adsorption filter using the powdery polymer binder of the present embodiment is set to be such that the polymer binder is contained at about 10 to 50 parts by mass relative to 100 parts by mass of the mixture of the activated carbon and the functional components in view of the effect of adsorbing the volatile organic compounds, the moldability, and the like. When the amount of the polymer binder is less than 10 parts by mass, a sufficient strength may not be obtained, raising a fear that the molded body cannot be formed. Also, when the amount of the polymer binder exceeds 50 parts by mass, there is a fear that the adsorption performance may be degraded. More preferably, the polymer binder is blended at 15 to 35 parts by mass relative to 100 parts by mass of the mixture of the activated carbon and the functional components.

Production of an adsorption filter using the powdery polymer binder of the present embodiment is carried out by an arbitrary method, so that the production method is not particularly limited. More specifically, a cylindrical adsorption filter (molded body) can be fabricated, for example, by putting the polymer binder and the granular activated carbon into a Henschel mixer, uniformly stirring and mixing the resultant, filling a mold made of aluminum uniformly with the mixture, and heating and fusing the resultant under pressure, as disclosed in Japanese Unexamined Patent Publication No. 2005-119902.

In the adsorption filter of the present embodiment, the water-passing conditions and the like are not particularly limited; however, filtration is carried out at a space velocity (SV) of 300 to 6500/hr so that the pressure loss may not increase to an extreme extent. The performance of the adsorption filter can be confirmed by plotting a relationship between each removal ratio calculated from the concentration of volatile organic compounds such as trihalomethane in the raw water and the transmitted water and the ratio of the water amount (L) that was allowed to flow from the start of water passing to the volume (cc) of a cartridge (accumulated transmitted water amount L/cc).

In the present embodiment, the water-passing method was carried out in accordance with a domestic water purifier testing method defined in JIS S 3201(2010), and the point at which the value became lower than 80% was determined as the removal performance. When the adsorption filter of the present embodiment is used as a water-purifying material, the adsorption speed is large, so that the performance thereof can be fully exhibited even at a flow rate with SV exceeding 1000/hr, whereby the container can be greatly reduced in scale. In the present embodiment, the chloroform filtration capability is preferably 25 liters or more per 1 cc of the adsorption filter at a space velocity of 2000 to 5000/hr.

Thus, the adsorption filter of the present embodiment exhibits a high performance under high-SV conditions, so that the adsorption filter is extremely useful.

The concentration of the volatile organic compounds and others in the raw water and the transmitted water can be measured by a known analysis method and, for example, the concentration of chloroform or 1,1,1-trichloroethane can be measured by a method of collecting a sample into a container, sampling the gas phase portion after sealing, and analyzing by gas chromatography, or the like method.

The adsorption filter of the present embodiment is used, for example, as a water-purifying filter or the like. When the adsorption filter is used as a water-purifying filter, the water-purifying filter may be obtained, for example, by producing the adsorption filter of the present embodiment according to the above-described production method, then neatening and drying the adsorption filter, and thereafter cutting the adsorption filter into a desired size and shape.

The adsorption filter may be compressed on a workbench in order to neaten the shape of the filter; however, when the adsorption filter is compressed too much, the surface of the activated carbon molded body may be consolidated, so that the compression is preferably carried out to a minimum extent. Further, in accordance with the needs, a cap may be installed on the tip end part, or a nonwoven fabric may be installed on the surface.

Also, the adsorption filter of the present embodiment can be used as a cartridge for water purification by filling a housing therewith. The cartridge is mounted in a water purifier to be subjected to water passing. As a water-passing method, a total filtration method in which a whole amount of raw water is filtered or a circulation filtration method is adopted. In the present embodiment, the cartridge mounted in the water purifier may be used, for example, by filling a housing with the water-purifying filter; however, the cartridge may be used by being further combined with known nonwoven fabric filters, various kinds of adsorption materials, mineral additive materials, ceramic filtering materials, hollow thread membranes, and the like.

Further, the cartridge for water purification may be directly filled with an activated carbon for use.

The water purifier comprised within the present invention is a water purifier using the aforementioned activated carbon or the aforementioned adsorption filter.

The present specification discloses techniques of various modes as described above, among which principal techniques will be summed up as follows.

An activated carbon according to one aspect of the present invention is an activated carbon for organic compound removal in which an average pore diameter obtained from a following formula by using a BET specific surface area calculated by a nitrogen adsorption method and a pore volume calculated by an HK method is from 1.615 to 1.625 nm:

$$D=4000\times V/S$$

(wherein, D represents the average pore diameter (nm), V represents the pore volume (m/g), and S represents the specific surface area ($m^2/g$)).

By having such a configuration, an activated carbon having an excellent adsorption removal capability on the volatile organic compounds can be provided. Above all, the activated carbon can exhibit an excellent adsorption removal capability on both of chloroform and 1,1,1-trichloroethane.

Also, in the activated carbon, the specific surface area is preferably from 1000 to 1350 $m^2/g$. This allows the aforementioned effects to be obtained with more certainty.

Further, the activated carbon is preferably obtained by using a coconut shell as a raw material. This seems to allow both of chloroform and 1,1,1-trichloroethane to be sufficiently adsorbed.

An adsorption filter according to another aspect of the present invention is characterized by containing the aforementioned activated carbon and a polymer binder. With such a configuration, an adsorption filter having an excellent adsorption removal capability on the volatile organic compounds can be provided.

Further, in the adsorption filter, a chloroform filtration capability is preferably 25 L or more per 1 cc of the adsorption filter when a space velocity (SV) is from 2000 to 5000/hr.

Also, a water purifier according to still another aspect of the present invention is characterized by using the aforementioned activated carbon or the aforementioned adsorption filter. With such a configuration, a useful water purifier having an excellent adsorption removal capability on the volatile organic compounds can be provided.

EXAMPLES

Hereafter, the present invention will be more specifically described by way of Examples; however, the present invention is by no means limited to the Examples. Values of physical properties in the Examples were measured by the following methods.
<Evaluation Method>
[Particle Diameter of Activated Carbon]

The 0% particle diameter (D0) in the volume-based cumulative particle-size distribution, the 10% particle diameter (D10) in the volume-based cumulative particle-size distribution, the 50% particle diameter (D50) in the volume-based cumulative particle-size distribution, and the 90% particle diameter D90) in the volume-based cumulative particle-size distribution were measured by the laser diffraction/scattering method using a wet particle size distribution measuring apparatus ("MICROTRAC MT3300EX II" manufactured by Nikkiso Co., Ltd.).

A specific method of measuring the particle size distribution will be shown below.
(Dispersion Liquid Preparation Method)

With ion-exchange water, polyoxyethylene(10) octylphenyl ether (manufactured by Wako Pure Chemical Industries, Ltd.) was diluted 50 times so as to prepare a dispersion liquid for measurement.
(Sample Liquid Preparation Method)

An amount attaining a transmittance ratio (TR) of 0.880 to 0.900 was weighed and put into a beaker, and 1.0 ml of the dispersion liquid was added. After stirring with a spatula, about 5 ml of ultrapure water was added and mixed so as to prepare a sample liquid.

A whole amount of the resulting sample liquid was poured into the apparatus, and analysis was made under the following conditions.
(Analysis Conditions)
Measurement times; average value of three times
Measurement time; 30 seconds
Distribution representation; volume
Particle diameter division; standard
Calculation mode; MT3000II
Solvent name; WAFER
Measurement upper limit; 2000 μm, measurement lower limit; 0.021 μm
Residual fraction ratio; 0.00
Passing fraction ratio; 0.00
Residual fraction ratio setting; invalid
Particle transmittance; absorption
Particle refractive index; N/A
Particle shape; N/A
Solvent refractive index; 1.333
DV value; 0.0882
Transmittance (TR); 0.880 to 0.900
Extension filter; invalid
Flow rate; 70%
Supersonic wave output; 40 W
Supersonic wave time; 180 seconds
[Specific Surface Area of Activated Carbon]

A nitrogen adsorption isothermal curve was measured at 77K of the activated carbon using BELSORP-MAX manufactured by BEL JAPAN, INC. From the obtained adsorption isothermal curve, analysis by the multiple-point method was carried out by the formula of BET, and the specific surface area was calculated from a straight line in a region of relative pressure p/p0 0.001 to 0.1 of the obtained curve. (More specifically, from the obtained curve, the specific surface area was calculated by using a straight line in which the correlation coefficient is the closest to 1 and the C value is not negative).
[Pore Volume of Activated Carbon (HK Method)]

The nitrogen adsorption isothermal curve was analyzed by the HK method. As the analysis conditions, the adsorptive molecular weight was set to be 28.010; the adsorptive density was set to be 0.808 gcm$^{-3}$; the file data interpolation method was set to be a straight line; and the parameter setting was set to be N2-C(77K).HKS.
[Average Pore Diameter of Activated Carbon]

The average pore diameter was calculated from the following formula by using the specific surface area and the pore volume obtained in the above:

$$D=4000\times V/S$$

(wherein, D) represents the average pore diameter (nm), V represents the pore volume (mL/g), and S represents the specific surface area (m$^2$/g)).
[Chloroform adsorption performance]
(Static adsorption amount)

An activated carbon was crushed to about 30 μm and subjected to a test after being dried at 115° C. for one hour. As test water, 100 ml of a chloroform containing aqueous solution in which chloroform concentration is adjusted to be about 100 μg/L was put into a vial bottle for 100 ml, and further a sample was added in a suitable amount. Then, a polytetrafluoroethylene sheet, a rubber plug for a vial, and an aluminum cap were mounted and fixed with an aluminum cap fastener. After the vial bottle was shaken at about 160 times/min for 2 hours with a shaker adjusted to be 25° C., 10 μl of methanol was injected with a micro syringe, and further the vial bottle was left to stand quietly for one hour in a thermostat of 25° C. After the vial bottle was left to stand quietly for one hour, a certain amount of the head space portion was collected through the rubber plug for the vial with use of a gastight syringe and analyzed by gas chromatography (ECD), so as to determine the chloroform concentration A in the sample liquid. In a similar manner, the chloroform concentration B, into which no activated carbon had been added, was determined as a blank value, and the adsorption amount M at the residual chloroform concentration was calculated by the following formula from the added activated carbon amount W. At this time, the activated carbon addition amount was changed so that the residual concentration would be around 10 μg/L. The measurement results were plotted in a double logarithmic chart with the lateral axis representing the residual concentration and the longitudinal axis representing the adsorption amount, so as to read the adsorption amount at which the residual concentration was 10 μg/L.

$$M=(B-A)\times 0.1\div W$$

In the present evaluation, the samples in which the static adsorption amount was 1.0 mg/g or more were rated as acceptable.
(Dynamic Adsorption Amount)

The activated carbon was classified with a sieve of JIS standard sieve opening of 0.3 to 0.15 mm and adjusted in particle size to have an average particle diameter of 0.23 mm, so as to prepare a sample. After the weight of a measuring cylinder of 100 ml was measured, about 100 ml of the sample was put, and the weight was measured to calculate the sample weight. Thereafter, the filling density was calculated from the volume obtained by lightly tapping the sample for 3 minutes on a rubber plate. From the calculated filling density, a sample weight for the amount of 60 ml was weighed, and a column having an inner diameter of 33 mmϕ and a height of 77 mm was filled with the sample while lightly vibrating the sample.

At this time, a nonwoven cloth was placed at the bottom part and the upper part of the column so that the sample would not be leaked out. A chloroform preparation water was passed from the upper part of the column by a procedure according to JIS S3201, and the accumulated water-passing amount L at which the removal ratio of the filtrated water relative to the raw water attained 80% was measured. The dynamic adsorption amount was determined from the following formula.

Dynamic adsorption amount=$L/60$

In the present evaluation, the samples in which the dynamic adsorption amount was 22.0 L/mL or more were rated as acceptable.

[1,1,1-trichloroethane adsorption performance]
(Static adsorption amount)

The adsorption amount at which the residual concentration was 10 μg/L was read by a method similar to that of measuring the static adsorption amount in the chloroform adsorption performance except that the 1,1,1-trichloroethane concentration was set to be about 300 μg/L. In the present evaluation, the samples in which the static adsorption amount was 2.4 mg/g or more were rated as acceptable.

(Dynamic Adsorption Amount)

The column was filled with the sample by a method similar to that of measuring the dynamic adsorption amount in the chloroform adsorption performance, and a 1,1,1-trichloroethane preparation water was passed by a procedure according to JIS S3201 so as to determine the dynamic adsorption amount from the accumulated water-passing amount at which the removal ratio attained 80%. In the present evaluation, the samples in which the dynamic adsorption amount was 20.0 L/mL or more were rated as acceptable.

[Filter Molded Body Density (g/ml)]

After the obtained cylindrical filter was dried at 120° C. for two hours, the molded body density (g/ml) was determined based on the measured weight (g) and volume (ml).

[Initial Water Flow Resistance]

A water flow resistance was measured after 10 minutes had passed from the start of passing water through the adsorption filter at a water flow rate of 3 liter/minute. With respect to the initial water flow resistance, samples having an initial water flow resistance of 0.10 MPa or less were rated as having a passing grade.

[Chloroform Filtration Capability]

Water was passed at an arbitrary flow rate in accordance with JIS S3201, and the accumulated water-passing amount until the removal ratio of the filtrated water relative to the raw water attained 80% was measured. The value obtained by dividing the accumulated water-passing amount by the filter volume was determined as a chloroform filtration capability. In the present evaluation, those with 24.2 L/cc or more were rated as acceptable.

[1,1,1-Trichloroethane Filtration Capability]

In the same manner as in the determination of chloroform filtration capability, water was passed at an arbitrary flow rate in accordance with JIS S3201, and the accumulated water-passing amount until the removal ratio of the filtrated water relative to the raw water attained 80% was measured. The value obtained by dividing the accumulated water-passing amount by the filter volume was determined as a 1,1,1-trichloroethane filtration capability. In the present evaluation, those with 30.0 L/cc or more were rated as acceptable.

[Raw Material]
(Activated Carbon)

Powdery activated carbon sample A: coconut shell raw material

Powdery activated carbon sample B: coconut shell raw material

Powdery activated carbon sample C: coconut shell raw material

Powdery activated carbon sample D: coconut shell raw material

Powdery activated carbon sample E: coconut shell raw material

Powdery activated carbon sample F: coconut shell raw material

Powdery activated carbon sample G: coconut shell raw material

Powdery activated carbon sample H: coconut shell raw material

Powdery activated carbon sample I: coconut shell raw material

The physical properties and the adsorption performance of each activated carbon particle are as shown in the following Table 1.

Also, a method of preparing each activated carbon is as follows.

(Activated Carbon Sample A)

A coconut shell carbon obtained by carbonizing a coconut shell made in the Philippines was adjusted in particle size to 0.425 to 1.00 mm. Subsequently, 1 kg of the coconut shell carbon was heated up to 500° C. and thereafter put into a rotary kiln (RK) of batch type while allowing a nitrogen gas to flow at 5 L/min. After the putting, the resultant was heated up to 920° C., and thereafter water vapor was allowed to flow at 5 L/min in addition to the nitrogen gas, so as to perform activation for 8 hours, whereby the benzene adsorption performance of the obtained activated carbon became 25%. The obtained activated carbon was activated at 900° C. for 10 minutes in a fluidized bed (FB) with an LPG combustion gas of 50 L/min until the benzene adsorption performance became 30%, followed by washing with hydrochloric acid and drying at 120° C. for 5 hours.

(Activated Carbon Sample B)

With use of coconut shell carbon similar to that of the activated carbon sample A, activation was carried out for 12 hours while allowing water vapor to flow at 5 L/min with the RK activation temperature changed to 900° C., whereby the benzene adsorption performance of the obtained activated carbon became 25%. Thereafter, in the same manner as in the activated carbon sample A, activation was carried out at 900° C. for 10 minutes until the benzene adsorption performance became 30%, followed by washing with hydrochloric acid and drying at 120° C. for 5 hours.

(Activated Carbon Sample C)

An operation similar to that of the activated carbon sample A was carried out until the RK activation. Then, the activated carbon in which the benzene adsorption performance became 25% was activated for 7 minutes with the FB activation temperature of 930° C., so as to obtain an activated carbon with a benzene adsorption performance of 30%. The washing and drying were carried out by an operation similar to that of the activated carbon sample A.

(Activated Carbon Sample D)

A coconut shell carbon obtained by carbonizing a coconut shell made in the Philippines was adjusted in particle size to 0.425 to 1.00 mm. Subsequently, FB activation at an activation temperature of 920° C. was carried out for one hour with an LPG combustion gas of 50 L/min until the benzene adsorption performance became 30%. The obtained activated carbon was washed with hydrochloric acid and thereafter dried at 120° C. for 5 hours.

(Activated Carbon Sample E)

A coconut shell carbon obtained by carbonizing a coconut shell made in the Philippines was adjusted in particle size to 0.425 to 1.00 mm. Subsequently, FB activation at an activation temperature of 920° C. was carried out for 1.1 hours with an LPG combustion gas of 50 L/min until the benzene adsorption performance became 33%. The obtained activated carbon was washed with hydrochloric acid and thereafter dried at 120° C. for 5 hours.

(Activated Carbon Sample F)

A coconut shell carbon obtained by carbonizing a coconut shell made in the Philippines was adjusted in particle size to 0.425 to 1.00 mm. Subsequently, FB activation at an activation temperature of 920° C. was carried out for 1.75 hours with an LPG combustion gas of 50 L/min until the benzene adsorption performance became 45%. The obtained activated carbon was washed with hydrochloric acid and thereafter dried at 120° C. for 5 hours.

(Activated Carbon Sample G)

A coconut shell carbon obtained by carbonizing a coconut shell made in the Philippines was adjusted in particle size to 0.425 to 1.00 mm. Subsequently, FB activation at an activation temperature of 920° C. was carried out for 3 hours with an LPG combustion gas of 50 L/min until the benzene adsorption performance became 54%. The obtained activated carbon was washed with hydrochloric acid and thereafter dried at 120° C. for 5 hours.

(Activated Carbon Sample H)

A coconut shell carbon obtained by carbonizing a coconut shell made in the Philippines was adjusted in particle size to 0.425 to 1.00 mm. Subsequently, FB activation at an activation temperature of 920° C. was carried out for 0.75 hour with an LPG combustion gas of 50 L/min until the benzene adsorption performance became 25%. The obtained activated carbon was activated for 2 hours with use of RK while allowing nitrogen to flow at 5 L/min and allowing water vapor to flow at 5 L/min at 920° C. until the benzene adsorption performance became 30%. The obtained activated carbon was washed with hydrochloric acid and thereafter dried at 120° C. for 5 hours.

(Activated Carbon Sample I)

A coconut shell carbon obtained by carbonizing a coconut shell made in the Philippines was adjusted in particle size to 0.425 to 1.00 mm. Subsequently, RK activation at an activation temperature of 920° C. was carried out for 10 hours while allowing nitrogen to flow at 5 L/min and allowing water vapor to flow at 5 L/min until the benzene adsorption performance became 30%. The obtained activated carbon was washed with hydrochloric acid and thereafter dried at 120° C. for 5 hours.

(Binder Raw Material)

Acrylic fibrous binder: CSF value of 90 ml (Lead Adsorption Material)

Titanosilicate-based lead adsorption material

Test Example 1: Evaluation of Activated Carbon

Figure 2:
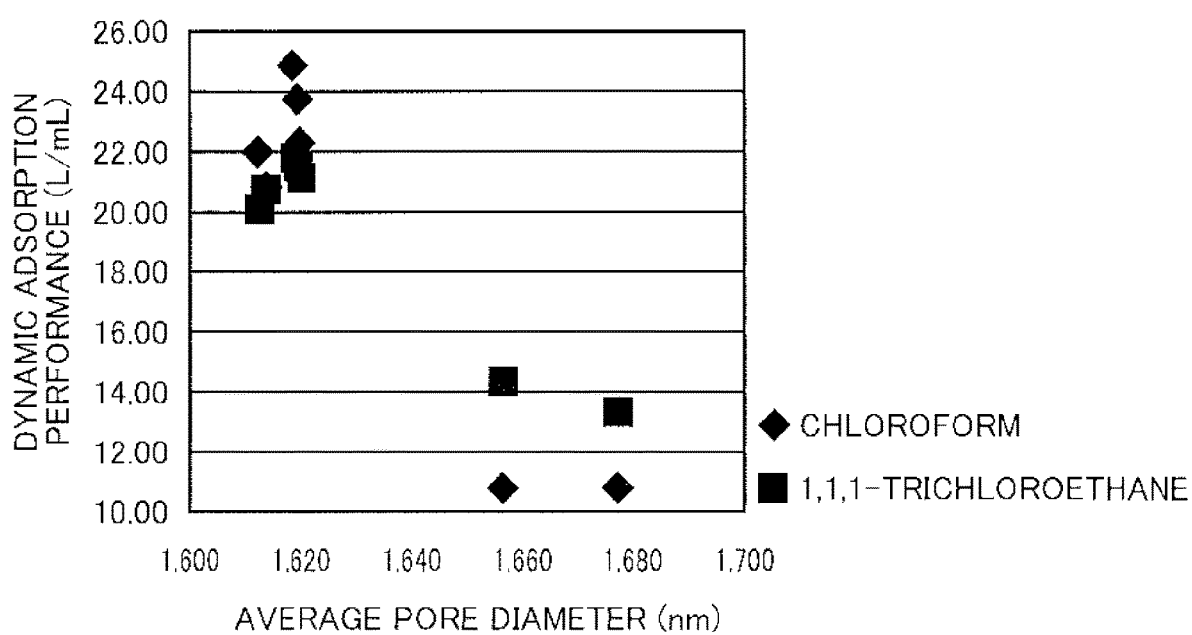
FIG. 2 is a graph showing a relationship between the average pore diameter obtained in the above formula and the performance of dynamic adsorption of volatile organic compounds in water, as measured in the Examples.

For each of the activated carbon samples A to I (Examples 1 to 3 and Comparative Examples 1 to 6) shown in the following Table 1, the physical properties and the adsorption performance were measured by using the evaluation methods described above. The results are shown in Table 1. Further, the results of the adsorption performance are also shown in the graph of FIGS. 1 and 2.

TABLE 1

|  | Activated carbon Samples | Physical properties | | | Chloroform | | 1,1,1-trichloroethane | |
|---|---|---|---|---|---|---|---|---|
|  |  | Specific surface area $m^2/g$ | Pore volume (HK method) mL/g | Average pore diameter nm | Static adsorption amount mg/g | Dynamic adsorption amount L/mL | Static adsorption amount mg/g | Dynamic adsorption amount L/mL |
| Example 1 | A | 1122 | 0.4541 | 1.619 | 1.17 | 24.80 | 2.74 | 21.80 |
| Example 2 | B | 1231 | 0.4986 | 1.620 | 1.12 | 22.37 | 2.53 | 21.17 |
| Example 3 | C | 1178 | 0.4770 | 1.620 | 1.02 | 23.67 | 2.57 | 21.50 |
| Comparative Example 1 | D | 1152 | 0.4647 | 1.614 | 0.78 | 21.9 | 2.44 | 20.10 |
| Comparative Example 2 | E | 1345 | 0.5422 | 1.612 | 0.92 | 20.7 | 2.45 | 20.70 |
| Comparative Example 3 | F | 1673 | 0.6929 | 1.657 | 0.48 | 10.8 | 1.48 | 14.30 |
| Comparative Example 4 | G | 1924 | 0.807 | 1.678 | 0.47 | 10.8 | 1.26 | 13.30 |
| Comparative Example 5 | H | 1158 | 0.4711 | 1.627 | 0.95 | 18.71 | 2.11 | 19.83 |
| Comparative Example 6 | I | 1057 | 0.4973 | 1.882 | 0.42 | 8.33 | 0.74 | 10.04 |

<Studies>

As will be clear from Table 1 and FIGS. 1 to 2, the activated carbons according to the Examples were each found to exhibit an excellent adsorption performance for both of chloroform and 1,1,1-trichloroethane. In contrast, the activated carbons of the Comparative Examples in which the average pore diameter was out of the range of the present invention were found to be poor in the adsorption amount of at least one of chloroform and 1,1,1-trichloroethane.

Test Example 2: Evaluation of Adsorption Filter

With respect to 94 parts by mass of each of the activated carbon samples shown in the following Table 2, 4 parts by mass of a binder and 6 parts by mass of a lead adsorption material were put, so as to attain a sum weight of 1.04 kg, followed by adding tap water to make the slurry amount be 20 liters.

Further, suction was made at 350 mmHg with use of a mold having numerous small holes of 3 mm diameter and having an outer diameter of 27.5 mm, an inner diameter of 10 mm, and a height of 101 mm, so as to obtain a hollow cylindrical molded body (adsorption filter) having an outer diameter of 28 mm, an inner diameter of 10 mm, and a height of 100 mm.

This molded body was put into a transparent plastic housing having a diameter of 32 mm, a length of 100 mm, and an internal presence amount of 80 cc, and water was passed from the outside to the inside. In accordance with the domestic water purifier testing method, chloroform and 1,1,1-trichloroethane were added so as to attain a total concentration of 0.060±0.020 mg/L and 0.300±0.060 mg/L, respectively, and water was passed at a flow rate and SV shown in the following Table 2.

Figure 3:
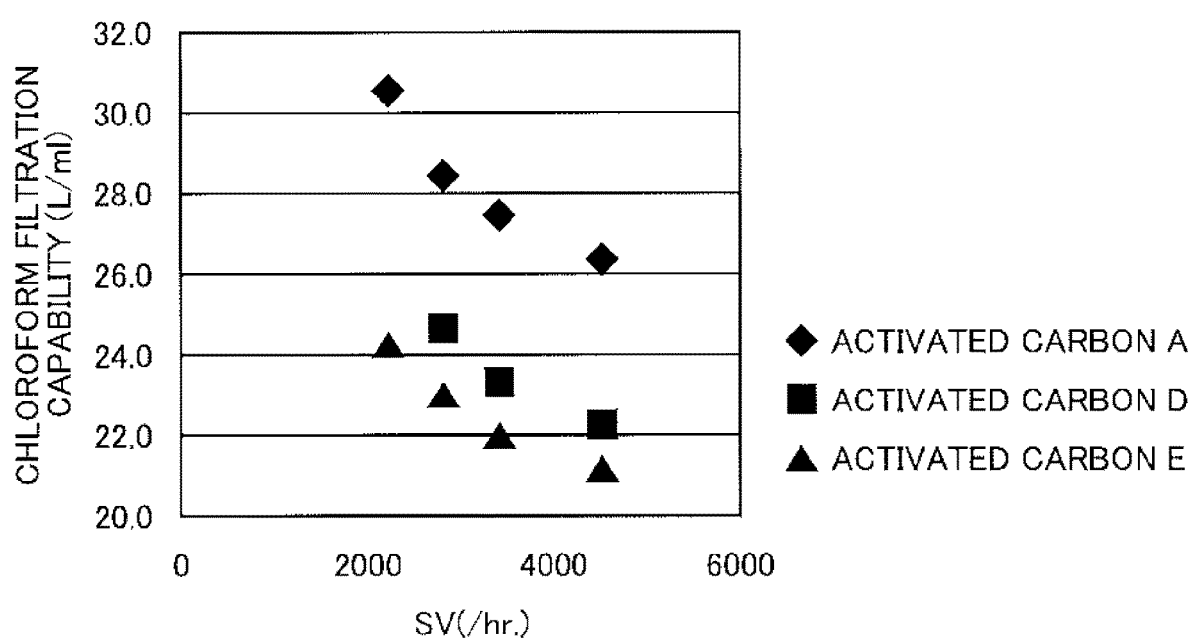
FIG. 3 is a graph showing a chloroform adsorption performance of activated carbon in the Examples and Comparative Examples.
Figure 4:
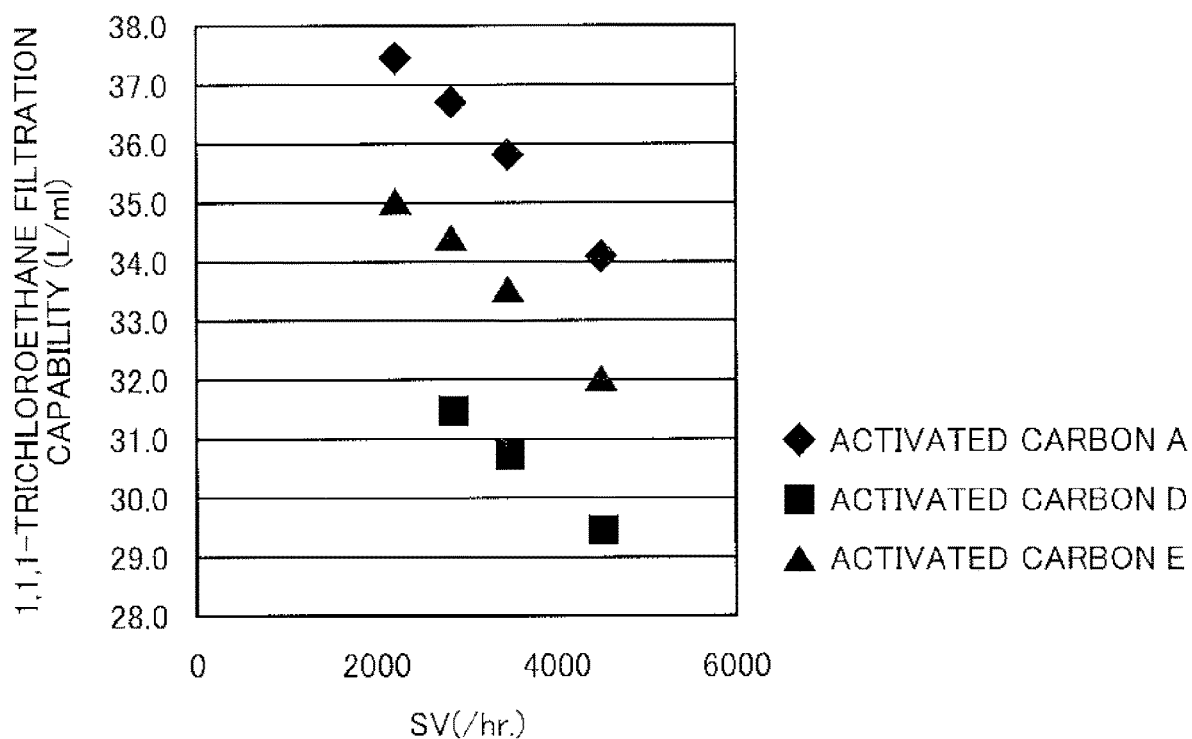
FIG. 4 is a graph showing a 1,1,1-trichloroethane adsorption performance of activated carbon in the Examples and Comparative Examples.

The results of performing the above-described evaluation test on the adsorption filter of each of the Examples 4 to 7 (using activated carbon A) and the Comparative Examples 7 to 13 (using activated carbon D or E) are shown in the following Table 2. Further, the filtration capability is also shown in the graph of FIGS. 3 and 4.

trichloroethane. In particular, it has been confirmed that the adsorption filters according to the Examples exhibit an excellent filtration capability under high SV conditions.

In contrast, the Comparative Examples that use an activated carbon having an average pore diameter larger or smaller than the range of the present invention were each found to be poor in filtration capability.

This application is based on Japanese Patent Application No. 2016-098421 filed on May 17, 2016, the entire contents of which are incorporated in the present application.

The present invention has been suitably and fully described by way of embodiments with reference to specific examples and others in the above description so as to express the present invention; however, it is to be recognized that those skilled in the art can easily change and/or improve the above-described embodiments. Therefore, it is interpreted that, unless the changes and modifications made by those skilled in the art are at a level that departs from the scope of the rights of the claims, those changes and modifications are all comprised within the scope of the rights of the claims.

TABLE 2

| | Samples | Activated carbon D0 μm | D10 μm | D50 μm | D90 μm | Lead adsorbent parts by mass parts | Binder parts by mass parts | CSF ml | Molded body volume ml |
|---|---|---|---|---|---|---|---|---|---|
| Example 4 | A | 9.32 | 21.9 | 41.1 | 73.9 | 6 | 4 | 90 | 53.7 |
| Example 5 | A | 9.32 | 21.9 | 41.1 | 73.9 | 6 | 4 | 90 | 53.7 |
| Example 6 | A | 9.32 | 21.9 | 41.1 | 73.9 | 6 | 4 | 90 | 53.7 |
| Example 7 | A | 9.32 | 21.9 | 41.1 | 73.9 | 6 | 4 | 90 | 53.7 |
| Comparative Example 7 | D | 9.29 | 20.0 | 39.1 | 71.1 | 6 | 4 | 90 | 53.7 |
| Comparative Example 8 | D | 9.29 | 20.0 | 39.1 | 71.1 | 6 | 4 | 90 | 53.7 |
| Comparative Example 9 | D | 9.29 | 20.0 | 39.1 | 71.1 | 6 | 4 | 90 | 53.7 |
| Comparative Example 10 | E | 9.30 | 20.5 | 39.6 | 72.4 | 6 | 4 | 90 | 53.7 |
| Comparative Example 11 | E | 9.30 | 20.5 | 39.6 | 72.4 | 6 | 4 | 90 | 53.7 |
| Comparative Example 12 | E | 9.30 | 20.5 | 39.6 | 72.4 | 6 | 4 | 90 | 53.7 |
| Comparative Example 13 | E | 9.30 | 20.5 | 39.6 | 72.4 | 6 | 4 | 90 | 53.7 |

| | Molded body density g/ml | Flow rate L/min | SV hr−1 | Initial water flow resistance MPa | Chloroform 80% breakthrough L | Chloroform Filtration capability L/ml | 1,1,1-trichloroethane 80% breakthrough L | 1,1,1-trichloroethane Filtration capability L/ml |
|---|---|---|---|---|---|---|---|---|
| Example 4 | 0.463 | 3.0 | 3400 | 0.059 | 1,480 | 27.6 | 1,920 | 35.8 |
| Example 5 | 0.463 | 2.5 | 2800 | 0.050 | 1,520 | 28.3 | 1,970 | 36.7 |
| Example 6 | 0.463 | 2.0 | 2200 | 0.041 | 1,640 | 30.5 | 2,010 | 37.4 |
| Example 7 | 0.463 | 4.0 | 4500 | 0.077 | 1,410 | 26.3 | 1,830 | 34.1 |
| Comparative Example 7 | 0.494 | 3.0 | 3400 | 0.078 | 1,250 | 23.3 | 1,650 | 30.7 |
| Comparative Example 8 | 0.494 | 2.5 | 2800 | 0.066 | 1,320 | 24.6 | 1,690 | 31.5 |
| Comparative Example 9 | 0.494 | 4.0 | 4500 | 0.101 | 1,190 | 22.2 | 1,580 | 29.4 |
| Comparative Example 10 | 0.473 | 3.0 | 3400 | 0.074 | 1,180 | 22.0 | 1,800 | 33.5 |
| Comparative Example 11 | 0.473 | 2.5 | 2800 | 0.061 | 1,230 | 22.9 | 1,850 | 34.5 |
| Comparative Example 12 | 0.473 | 2.0 | 2200 | 0.052 | 1,300 | 24.2 | 1,880 | 35.0 |
| Comparative Example 13 | 0.473 | 4.0 | 4500 | 0.095 | 1,130 | 21.0 | 1,720 | 32.0 |

<Studies>

As will be clear from Table 2 and FIGS. 3 to 4, the adsorption filters according to the Examples were each found to have a low resistance and to be extremely excellent in filtration capability for both of chloroform and 1,1,1-

INDUSTRIAL APPLICABILITY

The present invention has a wide range of industrial applicability in the technical field related to activated carbon, adsorption filters, and water purifiers.

The invention claimed is:

1. An activated carbon, having an average pore diameter of from 1.615 to 1.625 nm and a BET specific surface area in a range of from 1000 to 1350 m²/g,
    wherein the average pore diameter is obtained from a formula:

$$D = 4000 \times V/S$$

wherein,
    D is the average pore diameter (nm),
    V is a pore volume (mL/g), and
    S is the BET specific surface area (m²/g), and
    wherein the pore volume is calculated by an HK method, and
    wherein the BET specific surface area is calculated by a nitrogen adsorption method.

2. The activated carbon of claim 1, wherein the BET specific surface area is in a range of from 1122 to 1231 m²/g.

3. The activated carbon of claim 1, which is obtained from a coconut shell as a raw material.

4. An adsorption filter, comprising:
    the activated carbon of claim 1; and
    a polymer binder.

5. The filter of claim 4, having a chloroform filtration capability of 25 L or more per 1 cc of the adsorption filter at a space velocity in a range of from 2000 to 5000/hr.

6. The filter of claim 5, further comprising:
    silver.

7. The filter of claim 5, further comprising:
    a zeolite.

8. A water purifier, comprising:
    the filter of claim 4.

9. The activated carbon of claim 1, wherein the average pore diameter is no more than 1.621 nm.

10. The activated carbon of claim 1, wherein the average pore diameter is in a range of from 1.618 to 1.621 nm.

11. The activated carbon of claim 1, wherein the BET specific surface area is at least 1050 m²/g.

12. The activated carbon of claim 1, wherein the BET specific surface area is no more than 1300 m²/g.

13. The activated carbon of claim 1, wherein the BET specific surface area is in a range of from 1050 to 1300 m²/g.

14. The activated carbon of claim 1, wherein the BET specific surface area is at least 1100 m²/g.

15. The activated carbon of claim 1, wherein the BET specific surface area is no more than 1250 m²/g.

16. The activated carbon of claim 1, wherein the BET specific surface area is in a range of from 1100 to 1250 m²/g.

17. The activated carbon of claim 1, having a 10% particle diameter (D10) in a cumulative particle size distribution at volume standard in a range of from 15 to 35 μm.

18. The activated carbon of claim 1, having a 50% particle diameter (D50) in a cumulative particle size distribution at volume standard in a range of from 30 to 150 μm.

19. The activated carbon of claim 1, wherein the average pore diameter is at least 1.618 nm.

20. A water purifier, comprising:
    the activated carbon of claim 1.

* * * * *